Feb. 19, 1946.  M. LITMAN  2,395,130

MEASURING TOOL

Filed Jan. 18, 1945

INVENTOR.
Morris Litman.
BY
Attorney.

Patented Feb. 19, 1946

2,395,130

UNITED STATES PATENT OFFICE 2,395,130

MEASURING TOOL

Morris Litman, Springfield, Mass.

Application January 18, 1945, Serial No. 573,348

2 Claims. (Cl. 33—173)

This invention relates to improvements in measuring tools or devices. The principal objects of the invention are directed to the provision of improvements in devices for use in connection with a gauge or dial indicator having a reciprocating plunger operably connected to a pointer that traverses a series of graduations. The gauge is so constructed and arranged that very small movements of the plunger are greatly magnified by the pointer and graduations.

It is not possible to make certain desired measurements with a gauge but it is associated in such a way with the device of this invention that measurements are readily and easily transferred to the gauge.

Figure 2:
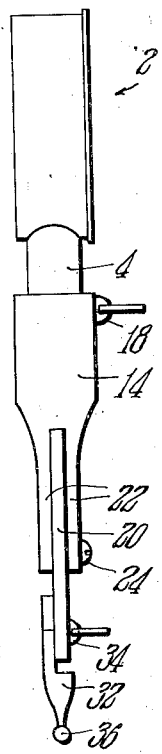
Figure 1:
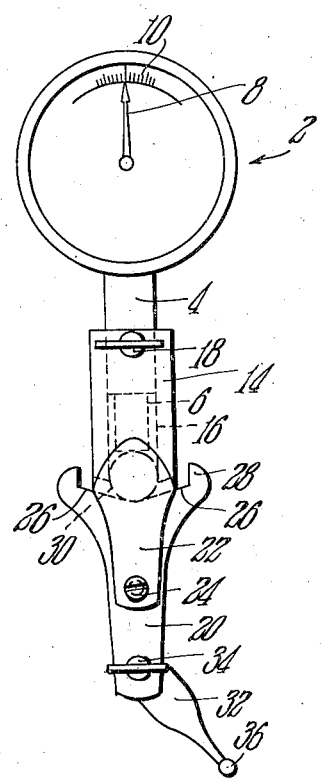

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Figs. 1 and 2 are front and side elevational views of the device of this invention with a gauge in association with the device as shown in Fig. 1.

Referring now to the drawing more in detail, the invention will be fully described.

A gauge is represented by 2 which has a shank 4. A plunger 6 is reciprocable in the shank and mechanism, not shown, is operated thereby to actuate a pointer 8 that traverses the graduations 10.

The gauge is constructed and arranged in the well known manner so that very small movements of the plunger move the pointer 8 through a relatively large angle so that thousandths and fractions of thousandths of an inch are indicated.

A body 14 is provided which has a bore 16 for slidably receiving the shank 4 of the gauge. A clamp screw 18 is in threaded engagement with the body for bearing on and clamping the shank 4.

An arm 20 is disposed in a suitable slot in the body between lugs 22 and is pivoted at 24 for swinging movements.

The upper edge of the arm is provided with angularly disposed cam faces 26 and ears 28 which may abut the side of the body to limit swinging movements of the arm.

A ball 30 is movable up and down in the bore 16 and rests on the faces 26 when the arm 20 is in the central position shown.

The gauge has its shank positioned in the bore of the body and is so clamped that with the plunger 6 on the ball 30 the pointer 6 registers with a certain graduation as for instance with the central or zero graduation when the arm is in central position.

A feeler 32 is pivoted to the lower end of the arm 20 on a clamp screw 34 passing therethrough that is in threaded engagement with the arm. Said feeler has a rounded end portion 36, as shown.

With the gauge engaged in the body as shown, the feeler 32 may be positioned so that its end may contact an object so as to swing the arm 20 in one direction or the other. Swinging of the arm 20 causes one of the cam faces 26 thereof to elevate the ball 30 which actuates the plunger 6. Swinging of the arm through a greater angle brings about a greater movement of the ball and consequently the plunger 6 than will a less angle so that any movement of the arm brings a corresponding movement of the plunger.

The feeler may be adjusted to any angle and make it possible for contacting in places inaccessible to the plunger.

The device may be used for the purpose of taking readings in any place desired since the feeler is readily and easily adjusted.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device for a dial gauge having a shank and a plunger reciprocable therein comprising, a body having a vertical bore for receiving said shank and clamp means for securing the shank in said bore, an arm swingable in the body from a central position to positions at either side thereof provided with cam faces at the lower side of the bore that diverge when the arm is in central position from the axis of said bore outwardly and upwardly, a ball in said bore movable upwardly therein when the arm is swung from said central position adapted to act on the plunger in said shank, a feeler swingable on the lower end of the arm, and means to secure the feeler to the arm in various positions.

2. A device for a dial gauge having a shank and a plunger reciprocable therein comprising, a body having a vertical bore for receiving said shank and a slot extending transversely therethrough which has its upper end intersecting the lower portion of said bore and providing lower portions at either side thereof, clamp means threadedly engaging said body for engaging and clamping said shank in the bore, an arm between said lower portions of the body pivoted thereto for swinging movements between a central position and positions at either side thereof, the upper edge of the arm provided with cam faces that diverge upwardly and outwardly from the axis of said bore when the arm is in central position, said cam faces terminating in upwardly extending portions adapted to abut the sides of the body as the arm swings from central position to limit movements thereof, a ball in said bore movable upwardly therein by said cam faces when the arm is swung from said central position adapted to act on the plunger in said shank, and a feeler adjustable on the lower end of said arm about a pivotal axis.

MORRIS LITMAN.